US006937937B1

(12) United States Patent
Manfred et al.

(10) Patent No.: US 6,937,937 B1
(45) Date of Patent: Aug. 30, 2005

(54) AIRBORNE BASED MONITORING

(75) Inventors: Mark Manfred, Edina, MN (US); Lucius Orville Taylor Jr., Minnetonka, MN (US); Anthony Vernon Brama, Lakeville, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/937,724

(22) Filed: Sep. 9, 2004

Related U.S. Application Data

(63) Continuation of application No. 10/856,288, filed on May 28, 2004.

(51) Int. Cl.[7] .......... G01V 3/00
(52) U.S. Cl. .......... 702/2; 340/971
(58) Field of Search .......... 702/2, 3; 340/971, 340/945; 701/202, 14, 1

(56) References Cited

U.S. PATENT DOCUMENTS

| | | | | |
|---|---|---|---|---|
| 4,015,366 A | | 4/1977 | Hall, III | 47/1.43 |
| 4,136,024 A | | 1/1979 | Bisa et al. | 210/610 |
| RE31,023 E | | 9/1982 | Hall, III | 405/37 |
| 4,642,775 A | | 2/1987 | Cline et al. | 701/200 |
| 4,706,198 A | | 11/1987 | Thurman | 701/120 |
| 4,992,942 A | | 2/1991 | Bauerle et al. | 700/284 |
| 5,265,024 A | | 11/1993 | Crabill et al. | 701/200 |
| 5,678,175 A | | 10/1997 | Stuart et al. | 455/13.1 |
| 5,893,717 A | | 4/1999 | Kirsch et al. | 434/118 |
| 6,006,251 A | | 12/1999 | Toyouchi et al. | 709/203 |
| 6,012,675 A | | 1/2000 | Cocatre-Zilgien | 244/16 |
| 6,023,605 A | | 2/2000 | Sasaki et al. | 455/12.1 |
| 6,043,756 A | * | 3/2000 | Bateman et al. | 340/945 |
| 6,184,816 B1 | | 2/2001 | Zheng et al. | 342/26 R |
| 6,275,231 B1 | | 8/2001 | Obradovich | 359/248 |
| 6,317,686 B1 | | 11/2001 | Ran | 701/210 |
| 6,336,072 B1 | | 1/2002 | Takayama et al. | 701/200 |
| 6,353,794 B1 | | 3/2002 | Davis et al. | 701/201 |
| 6,370,475 B1 | | 4/2002 | Breed et al. | 701/301 |
| 6,405,132 B1 | | 6/2002 | Breed et al. | 701/301 |
| 6,501,392 B2 | * | 12/2002 | Gremmert et al. | 340/971 |
| 2001/0009458 A1 | | 7/2001 | Asaka | 356/28.5 |
| 2002/0000479 A1 | | 1/2002 | Howard | 239/124 |

(Continued)

OTHER PUBLICATIONS

Bruce D. Nordwall, "Digital Data Link, GPS to Transform Airline Ops,"*Aviation Week & Space Technology* (Jun. 14, 1999), pp 1-5 http://www.aviationnow.com/content/ncof/ncft08.htm.

(Continued)

*Primary Examiner*—John Barlow
*Assistant Examiner*—Victor J Taylor
(74) *Attorney, Agent, or Firm*—McDonnell Boehnen Hulbert & Berghoff LLP

(57) ABSTRACT

A weather monitoring and prediction system that uses a fleet of aircraft to obtain data. Each aircraft has a local air data system that facilitates the measurement, recordation, and transmittal of local atmospheric data such as barometric pressure, and the corresponding temporal, positional, and altitudinal data. The data is electronically transmitted from each aircraft to a ground based processing system where it is stored. The data may then be transmitted to subscribing users such as aircraft, other weather data systems or to air traffic control centers in either a compiled form or in a raw form. Another embodiment also provides for measuring barometric pressure as a function of altitude at an in-flight aircraft.

18 Claims, 4 Drawing Sheets

U.S. PATENT DOCUMENTS

| | | | | |
|---|---|---|---|---|
| 2002/0007982 A1 | 1/2002 | Howard | 184/6.2 |
| 2002/0026284 A1 | 2/2002 | Brown | 702/3 |
| 2002/0039072 A1 | 4/2002 | Gremmert et al. | 340/945 |
| 2002/0098800 A1 | 7/2002 | Frazita et al. | 455/12.1 |

OTHER PUBLICATIONS

Shari-Beth Nadell, "Weather Accident Prevention," pp. 1-2, http://avsp.larc.nasa.gov/new_wx.html.

* cited by examiner

Data Record
Air_Unit = 9942
Time = 11:34 a.m. GMT, February 12, 2004
Longitude = 41 59 N
Latitude = 87 54 W
Altitude = 28,231 ft
Barometric Pressure = 10.209 in Hg
Wind = 2751 (270 degrees, 51 knotts)
Outside Temperature = -40 F
Ground Speed = 600 mph

AIRBORNE BASED MONITORING

CROSS-REFERENCE TO RELATED APPLICATIONS

This application is a continuation of application Ser. No. 10/856,288, filed May 28, 2004.

FIELD

The present invention relates to a measurement system and method for determining local atmospheric conditions aboard an airborne aircraft.

BACKGROUND

Each day hundreds of scheduled flights operated by the major airlines, such as United Airlines, America Airlines, Delta, Northwest, Luftansa, Aer Lingus, and VietNam air traverse routes between cities throughout the world. In addition, cargo carriers, such as the United Post Office, DHL, Federal Express, and United Parcel Service fly routes throughout the world on a daily basis. Aircraft on these regularly scheduled flights travel generally predictable routes at generally predictable times. In addition to these commercial flights, there are numerous charter and general aviation flights, amounting to thousands of aircraft aloft each day, covering a large geographic area and encountering a wide variety of atmospheric and weather conditions at different locations and altitudes at different times of the day.

Weather conditions affect many aspects of human life such as agriculture production and famine, public safety, transportation, tourism and communications. Thus, improved weather forecasting has many potential benefits. The combination of ground-based monitoring and satellite imagery have substantially enhanced weather prediction, however, weather forecasting can be further enhanced with more accurate weather data of conditions aloft.

In addition, aircraft generally use static barometric pressure meters for determining altitude above sea level or relative to ground level. Such pressure altimeters operate by measuring local static pressure and comparing the measured pressure to a lookup table or calibration curve (correlating barometric pressure to altitude) in order to determine the corresponding altitude. This measure of altitude is referred to as pressure altitude because it is based upon a reading from an atmospheric pressure measurement device such as a static port and pressure transducer. A pressure altitude measurement, however, may not reflect the true altitude of the aircraft because the measurement is based on the assumption that atmospheric pressure is solely a function of altitude. This assumption may be incorrect—as other factors may alter the atmospheric pressure. Thus, a reading of pressure altitude may vary from "true altitude". Barometric pressure readings (and thus pressure altitude measurements) are affected by other atmospheric conditions such as wind speed and temperature. Thus, circularity problems arise when attempting to obtain a measure of atmospheric conditions as a function of altitude.

SUMMARY

An improved system and method for monitoring and accumulating atmospheric weather conditions is provided through the use of atmospheric, positional, altitudinal, and temporal data collection equipment aboard in-flight aircraft. According to an aspect of the invention, measurement equipment is placed aboard a plurality of monitoring aircraft and is configured to record local atmospheric conditions relative to the location of the aircraft. Preferably, each record of local atmospheric conditions is corecorded with 1) a date/time stamp representing the time of measurement, 2) a position reading representing the location of the aircraft at the time of measurement, and 3) an altitude reading representing the altitude of the aircraft at the time of measurement.

According to an embodiment, any number of weather or inertial parameters, such as atmospheric pressure, outside air temperature, wind speed, and wind direction are measured from equipment aboard a plurality of airborne aircraft. For convenience these atmospheric/inertial measures are termed primary measurements.

Preferably, secondary measurement means are also utilized to provide an independent measure of aircraft altitude and position. For instance, a global positioning system GPS receiver may be used to provide the location of the aircraft, including its altitude. According to an embodiment, a primary measurement, such as a barometric pressure reading, is correlated with a secondary measurement, such as true altitude information from a GPS receiver.

Recorded data may be transmitted in real time to ground monitoring stations. In an embodiment, ground monitoring stations are capable of compiling data from a plurality of aircraft to generate real-time three-dimensional maps of weather conditions aloft. Weather forecasters, for example, could use this more detailed and accurate meteorological data to improve weather forecasts. The data could also provide excellent information to help optimize aircraft routing.

According to another embodiment, an apparatus is provided for measuring barometric pressure as a function of altitude at an in-flight aircraft. The apparatus has an atmospheric pressure transducer for measuring outside air pressure and a second altimeter for determining altitude without regard to atmospheric pressure. A server is configured for receiving signals from the transducer and altimeter. Likewise, a transceiver is configured for transmitting recorded data from the server to a ground-based station while the airplane is in-flight. Thus, the ground-based station is provided with data reflecting barometric pressure as a function of altitude.

DETAILED DESCRIPTION

Figure 1:
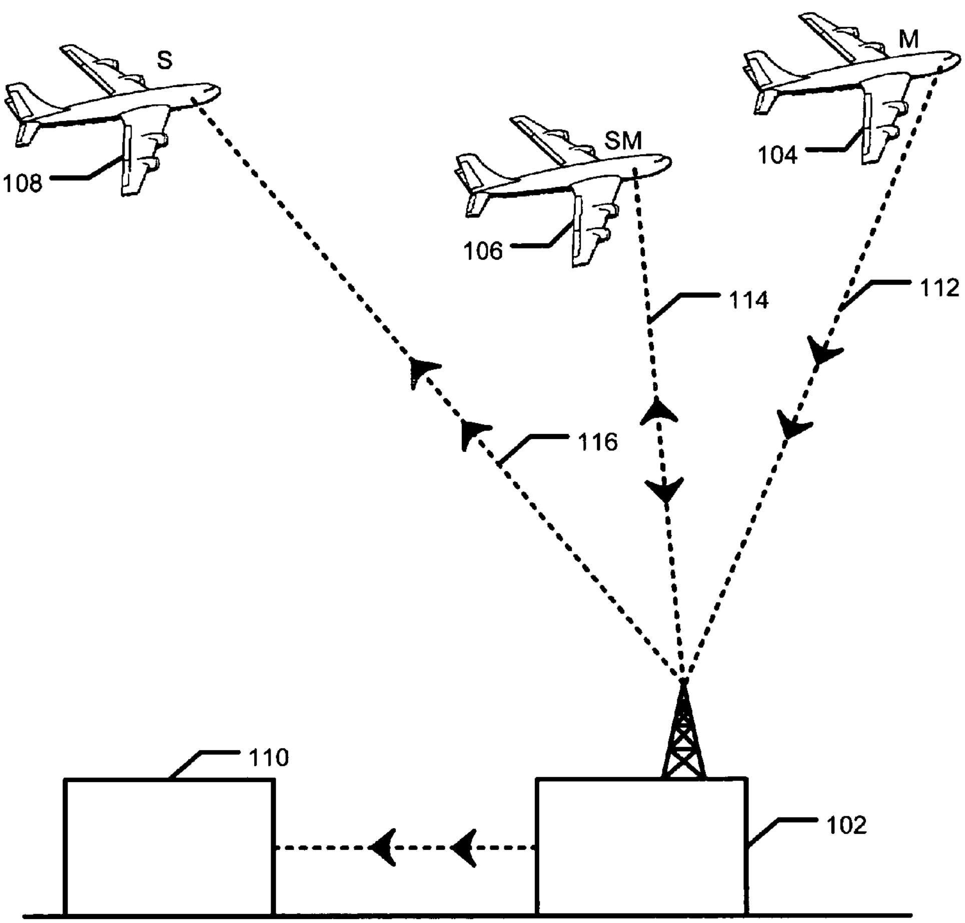
FIG. 1 is a schematic diagram of an embodiment of a system for measuring and transmitting data between airplanes, users, and a server.

FIG. 1 is a schematic illustration of an exemplary embodiment of an airborne monitoring system. In particular, FIG. 1 demonstrates the communication pathways of the exemplary embodiment. Three aircraft 104, 106, and 108 are shown and are labeled M, SM, and S to designate their respective functionality. M-aircraft 104 is labeled M because it operates as a monitoring airplane that monitors weather conditions and transmits recorded conditions and the corresponding date, time, location and altitude tags to a ground based processing center 102 via a wireless downlink 112.

In comparison, S-aircraft 108 is labeled S to indicate that it operates as a subscriber or user. S-aircraft 108 receives indicia of upcoming weather conditions via a wireless uplink 116 from the ground based processing center 102. SM-aircraft 106 operates as both a subscriber and a monitor and is thus labeled SM. SM-Aircraft 106 both sends and receives weather information and thus has a two-way data communication 114 with the ground based processing center 102.

There are a variety of different ways of transmitting data from aircraft 104, 106, 108 to ground stations 102. The connections shown in FIG. 1 are merely exemplary and are simplified for ease of illustration and explanation. In a preferred embodiment, on-board data communications equipment such as Airline Communications Addressing and Reporting System (ACARS) or SATCOM communications systems, can be used to communicate data from aircraft to ground station. In a system using SATCOM, for example, data would be sent to the ground-based station 102 through a path passing through a communications satellite and a satellite receiver before reaching the ground-based station.

Although a high bandwidth communication channel is preferred, the system could utilize a very low-speed data stream from each aircraft. For example, one message may be transmitted every 10 seconds (i.e. approximately one data point per mile). In one embodiment, each message would comprise 112 bits as follows: Aircraft ID (16 bits), Time/Date (16 bits), Position (32 bits), Altitude (16 bits), Barometric Pressure (8 bits), Windspeed (8 bits), Wind Direction, (8 bits), and Temperature (8 bits). This configuration may be operated in a bandwidth requirement of, for example, less than 12 bits per second. Other information may also be added to the data-stream such as aircraft type, aircraft weight, and accelerometer readings. In a further embodiment, multiple messages may be bundled for very low priority transmission over ACARS or other communication facility.

Additionally, even in aircraft that are purely monitoring 104, or purely subscribing 108 some data or control messages will still be transmitted in the opposite direction shown in data links 112 and 116. Such reverse direction data may, for example, indicate the state of the receiving equipment, indicate a request for predictive indicia, or indicate success or error in transmission.

In other embodiments, it is possible to have multiple ground-based processing centers rather than a single center as shown in FIG. 1. Geographic regions or political boundaries may serve as likely demarcation sites between the regions monitored by the various processing centers. For example, if the Air Traffic Control is a subscribing user, it may be advantageous to divide regions based on the various regional Air Traffic Control locations.

A further embodiment provides a ground-based user 110 that receives weather indicia from the ground-based processing center 102. The ground-based user 110 may then broadcast the information to its own set of private subscribers or may use the information for other aviation or non-aviation related purposes. The ground-based user 110 may be an entity such as the FAA that uses the data to assist air traffic controllers, the National Weather Service, or other commercial weather information service providers.

Many commercial aircraft are equipped with an Air Data Inertial Reference System ("ADIRS") or other local air data system to measure conditions such as outside air temperature, wind speed and wind direction, and barometric pressure. For example, two ARINC 429 standard data busses can provide ADIRS capability to measure position, altitude, normal accelerations, wind direction, wind speed, and outside air temperature among other parameters.

Figure 2:
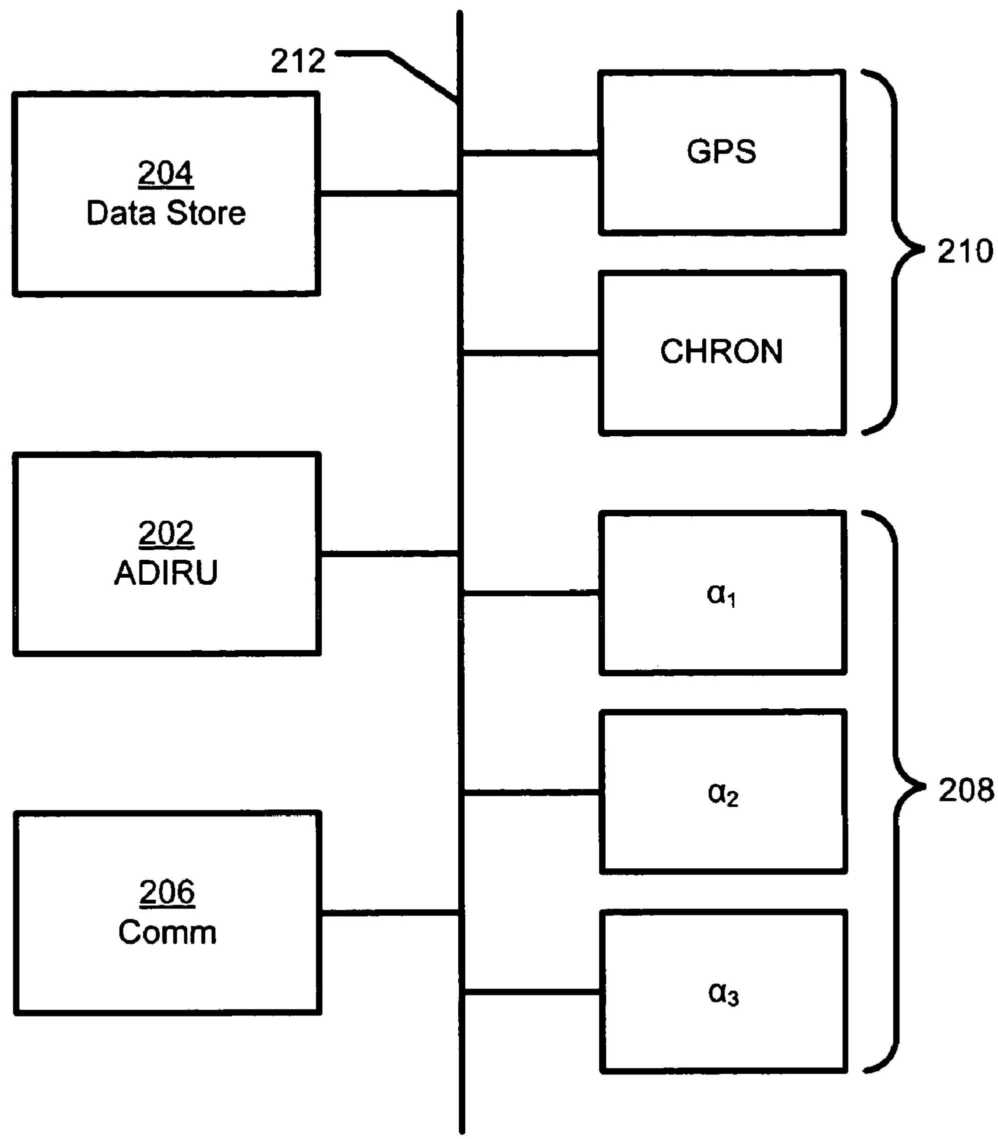
FIG. 2 is a schematic diagram of an organization of measuring equipment aboard a monitoring aircraft.

FIG. 2 is a schematic diagram of the organization of measuring equipment (such as a modified ADIRS) aboard a monitoring aircraft in an embodiment. An air data inertial reference unit (ADIRU) 202 is connected with a data store 204 though a data bus 212. The data store 204 is configured to, among other functions, store locally generated data. Primary measuring devices 208 are labeled $\alpha_1$, $\alpha_2$, and $\alpha_3$ and are configured to measure local atmospheric conditions. Although this schematic only shows three measuring devices, it is likely that more would be available, or as few as one could be used. For example, the various measuring devices may include a static air temperature gauges, total air temperature probes, air data modules, wind-direction measurement devices, total pressure gauges, static pressure gauges, a relative humidity gauge, and orthogonally positioned accelerometers. In a further embodiment, orthogonally positioned gyroscopes for measuring angular rates and accelerometers are included as measuring devices.

Alternatively, a subset of the described primary measurement devices or other devices may be used. The ADIRU 202 is also connected to corecordation devices 210 through the bus 212. These corecordation devices 210 are labeled GPS and CHRON in FIG. 2 and are configured to generate positional data, altitudinal data, and temporal data. The corecordation devices 210 are also known as secondary measurement devices because they obtain measurements that are independent of quantities measured by the primary measurement devices 208. Each time that a record is generated from a primary measuring device 208, records are also created from each of the corecordation devices 210 and stored in the data store 204. When records are to be sent to a ground-based station, data from the data store 204 is delivered to the communications device 206, which transmits the record. As one skilled in the art will understand, other arrangements are available to perform the function of obtaining, recording and transmitting primary and secondary measurements at an in-flight aircraft. The embodiments described should be seen as instructional rather than limiting.

Preferably, atmospheric pressure readings is implemented through air data modules (ADMs) using atmospheric probes to measure both total pressure and static pressure and wind speed as well. An ADM would serve as a pressure transducer to measure both static and total pressure and convert those readings to a digital format. More than one ADM may be used on a single aircraft. This redundancy can provide for more accurate readings as well as provide a safeguard in case of failure of an individual element.

Static barometric pressure is used in aviation to determine altitude above sea level or a known airfield. An aircraft determines its altitude by ascertaining the atmospheric pressure reading of the nearest airfield at a known distance above sea level. From the barometric pressure reading at the known altitude of the nearest field, the aircraft can ascertain its own altitude by comparing its measured barometric pressure reading to a chart of barometric pressure, which is adjusted according to the barometric pressure at the known airfield. Using GPS as a secondary measurement means, however, aircraft altitude can be determined independent of variances in barometric pressure. Using a secondary measurement means for altitude, such as GPS, barometric pressure readings can be correlated and compared to altitude measurements to provide more detailed and accurate barometer/altitude information.

Figures 3, 4:
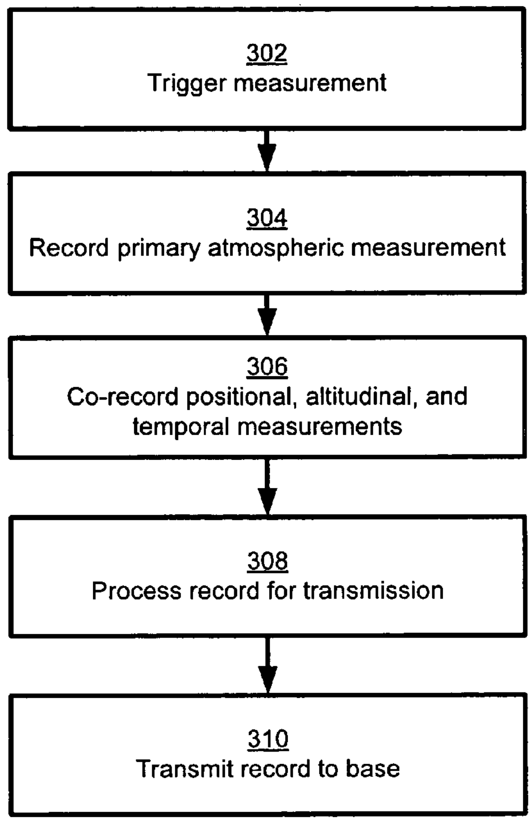
FIG. 3 shows a process flow within a monitoring aircraft.
FIG. 4 shows an exemplary data organization.

FIG. 3 shows a preferred process flow of measuring equipment within one of a plurality of monitoring aircraft such as M-aircraft 104 of FIG. 1. In one mode of operation, a time sensitive automatic trigger begins a measurement sequence at step 302. Preferably, triggering is controlled by a microprocessor or CPU on an ADIRS. Triggering may be activated by a programmable timer or other electronic or mechanical means. At predetermined intervals, the microprocessor is programmed to trigger the operation of measurement equipment according to the prescribed criteria.

A wide variety of intervals and trigger conditions can be selected and programmed by those of skill in the art according to the desired data collection results. For instance, the various atmospheric measurement devices (a) may be triggered using different time sequences. For example, temperature may be recorded at one-minute intervals while barometric pressure recorded at intervals of two minutes. In addition, rather than being linked to time, the automatic trigger can also be based on trigger consitions, such as the distance traveled by the aircraft. As an example, one measurement for device a would be recorded each K miles traveled by the aircraft.

In an alternate embodiment, the measurement sequence is triggered by a change in certain conditions. For example, a sharp increase in lateral vibrations or local light refraction may indicate clear air turbulence. A tighter set of data would be beneficial for determining the size and extent of an area of turbulence. Thus, the trigger may increase the rate of recordation in the face of such conditions. Similarly, a sharp decrease in barometric pressure seen as a function of altitude or position may indicate a weather front. The rate of triggering at step 302 could thus be set to increase in that circumstance. Increasing the frequency of recordation allows more detailed atmospheric data to be collected during times of particular interest. In another example, barometric pressure readings can be triggered to be recorded during change of the aircraft's altitude to collect barometric pressure readings over a range of different altitudes. The altitude of the aircraft is monitored and during changes in altitude the frequency of barometric pressure readings can be increased to develop a comprehensive profile of barometric pressure readings across different altitudes.

In addition to an automated trigger, a manual trigger may also be available. In a region or time of specific interest, a crewmember may be able to start the measurement process or increase the rate of recordation in order to increase the available measured data. In another embodiment, the manual trigger may simply alter the settings of the automated trigger manager. Once a measurement is triggered at step 302, at least one primary measurement is recorded at step 304. As discussed, a primary measurement may, for example, record an atmospheric condition such as temperature, winds aloft, or barometric pressure.

With each recordation of a primary atmospheric condition, the air data system corecords temporal, positional, and altitudinal measures at step 306. In an embodiment, secondary measurement means are utilized to provide an independent measurement of aircraft altitude, position, and time. The term secondary measurement means to refer to measurements recorded without reference to local atmospheric conditions. For example, Global Navigation Systems (GNS) such as GPS may be used to communicate with geosynchronous satellites to calculate both position and altitude. Secondarily, radio altitude can be calculated by correlating a measurement of the aircraft height above the ground to terrain elevation data. More generally, both GNS and radio altitude sensors are forms of radiofrequency altitude sensors.

Other secondary measurement means may be available. A single device need not measure altitude, position, and time. Rather, a secondary altimeter may measure altitude using radar or GNS or other means. In addition, a secondary chronometer may measure time using an internal clock within the local air data system or ADIRU.

The record-set (comprising primary and secondary measurements) is processed for transmission at step 308 and transmitted to a base station at step 310. Depending upon the communication system, data compression, delayed transmission, or data batching may be necessary in the processing step 308.

FIG. 4 shows an example of a data record correlating atmospheric condition readings, in particular barometric pressure readings, to 3 dimensional GPS positional (latitude and longitude) and altitude data, barometric pressure and temporal data. Also shown in FIG. 4, just for example, is outside temperature, winds aloft and ground speed. Using the combined data record, barometric pressure readings each atmospheric reading becomes more valuable through the linkage of the various data sets. Measured barometric readings and other atmospheric conditions can then be correlated to GPS and temporal readings. An aircraft identifier (air_unit) is also shown to identify the particular aircraft taking the readings. Other identifiers may be transmitted as well. As will be understood by those skilled in the art, other measurements and measuring units can be used.

Figure 5:
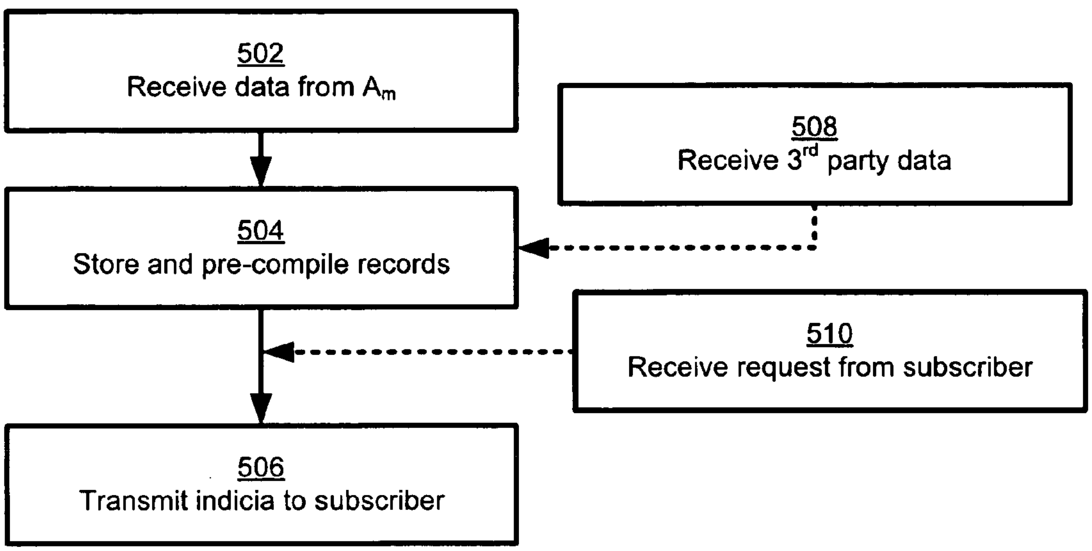
FIG. 5 shows a preferred processes flow within a base station.

FIG. 5 shows a preferred processes flow within a base station. The base station first receives measured data from a monitoring aircraft (denoted $A_m$) at step 502. The data is stored in a data store and precompiled at step 504. In one embodiment, additional data may also be received from a $3^{rd}$ party at step 506. For example, the national weather service may provide satellite or other weather information to the base station. A set of predictive indicia is then created for a subscriber such as a subscribing aircraft at step 506. In some cases, the predictive indicia may be requested by the subscriber as shown by step 510. When requesting predictive indicia, the subscribing aircraft may indicate information such as, for example, its current location, altitude, heading, flight-path, desired bandwidth, desired batch size, and other options so that the predictive indicia can be specifically tailored to the needs of the subscribing aircraft in the precompiling process of step 504. This request may be made along the same pathway as the data flows of FIG. 1 or along another pathway. Because it is expected that the size of data-batches uploaded to subscribing users will be greater than that downloaded from requesting users or from monitoring airplanes, it may be more efficient to implement the system with high bandwidth for uploads but lower bandwidth for downloads.

In another embodiment, a turbulence prediction data service is disclosed that provides a map of regions of airspace where turbulence is predicted. The turbulence predictions would come from previously experienced turbulence data from aircraft flying in the area. Data collection would come from the Inertial Reference Systems flying in commercial airliners and business jets. An IRS calculates a normal acceleration component. Based on frequency and amplitude, a normal acceleration algorithm could be created to interpret acceleration as turbulence. An aircraft sensing turbulence would transmit the information to the ground where it would be combined with the same information from all other aircraft in a region. In an embodiment, data records are enhanced through other atmospheric condition measurements that are correlated with altitude, position, and time.

With data coming in from an entire fleet of aircraft, an on-ground algorithm may predict turbulence for regions of the airspace. A ground service could transmit turbulence predictions back to subscribing aircraft. The aircraft may display such forecast information in a map display or in some other format. In addition, the information could be used by a flight path calculator to route a new path around expected turbulence. The turbulence information from the network could be available electronically in the cockpit for anyone who subscribes. The ambiguity of pilot reports and the unreliability of a relay from ATC thus, could be eliminated. In addition, the service could provide a standardized categorization of turbulence instead of relying on a pilot's subjective interpretation.

In another embodiment of the present invention, additional information may be provided to the system by a flightcrew. For example, a keypad may be provided for a crewmember to enter a weather reading. In one embodiment, the keypad would allow one-touch activation. A crewmember may push a first button to indicate level-one weather, a second button to indicate level-two weather, or a third button to indicate level-three weather. These would be considered as primary measurements by the system such as those shown as element(s) 208 in FIG. 2.

It is expected that the data garnered by the present invention will be used by meteorologists to improve their weather forecasts for industries outside aviation. In this embodiment, the parallel readings achieved by each of a plurality of aircraft are received and compiled by a ground based monitoring system then electronically delivered to meteorologists at, for example, the National Weather Service. Those meteorologists would then incorporate the new data into weather forecasting or other models.

In terms of monitoring airplanes, the preferred embodiment places the system aboard commercial fleet of aircraft. However, the present invention is also applicable to use on other aircraft such as general aviation, private business airplanes, and military airplanes. Military airplanes already have on-board sophisticated information recordation devices as well as communications devices. In one embodiment of the invention, both the monitoring aircraft and subscribing users would be government controlled aircraft and facilities respectively. In that case, military could retain a tactical advantage by retaining control over information flow.

In the case of general aviation airplanes and business jets, these aircraft may not already be equipped with ADIRU or other measurement control devices. By modifying the functionality of onboard systems and adding processing, storage, communications and measurement devices, these airplanes could also perform as elements in the current invention. Secondarily, all monitoring aircraft need not measure all possible local measurements to add functionality to the system. In particular, many aircraft are already equipped with a static air pressure sensor that is currently being used for calculation of altitude and groundspeed. At the same time, GPS or other global navigational system or secondary position sensor can serve to generate the co-recorded positional data. In one embodiment of the present invention, a subscribing user may request weather indicia indicative of weather at a lower altitude than that flown by traditional commercial jets. For example, non-aviation-related users such as local travelers and agriculturalists may be more interested in low-lying weather systems. In this case, general aviation monitoring airplanes may be well suited to deliver such indicia based on their lower flying altitudes. In some aircraft, it may be costly to implement the invention using traditional electronic connections. Thus, in one embodiment of the invention, measurement transducers communicate to the local air data system using direct wireless communication. For example, a static pressure transducer may be attached to a wireless transmitter. At the same time, the local air data system may be attached to a wireless receiver. Thus, during flight the static pressure transducer measures and transmits data via the wireless transmitter to the local air data system. Alternatively, the wireless communication may pass through a wireless local area network (WLAN). These are merely examples measurement devices and are not meant to limit the scope of the invention.

A variety of embodiments have been described above. More generally, those skilled in the art will understand that changes and modifications may be made to these embodiments without departing from the true scope and spirit of the present invention, which is defined by the claims. Drawings have been provided to aid in understanding embodiments; however, they should not be seen as scale drawings.

We claim:

1. A weather monitoring system comprising:

within each of a plurality of monitoring airplanes:

a local air data system for recording data on local atmospheric conditions;

primary measurement means comprising a static air pressure transducer for measuring local atmospheric conditions;

at least one secondary measurement means for measuring positional, altitudinal, and temporal data without reference to local atmospheric conditions, wherein each local atmospheric datum measured by the primary measurement means is corecorded with a recordation time representing the time of measurement, a recordation position representing the position of the aircraft at the time of measurement, and a recordation altitude representing the altitude of the aircraft at the time of measurement;

within one or more ground-based processing centers:

electronic reception equipment for autonomously receiving data from monitoring airplanes, wherein the atmospheric, positional, altitudinal, and temporal data are transmitted to the ground based processing centers for compilation;

means for receiving and compiling the atmospheric, temporal, altitudinal, and positional data from each monitoring aircraft to create a set of predictive indicia; and means for advising the subscribing user of upcoming weather conditions.

2. The weather monitoring system of claim 1, wherein the set of predictive indicia is atmospheric pressure as a function of altitude, position, and time.

3. The weather monitoring system of claim 2, further comprising local communication means for transmitting the recorded data from the static air-pressure transducer to the local air data system.

4. The weather monitoring system of claim 3, wherein the local communication means for transmitting the recorded data from the static air-pressure transducer to the local air data system comprise:

a wireless transmitter electronically connected to the static air-pressure transducer; and a wireless receiver electronically connected to the local air data system.

5. The weather monitoring system of claim 1, wherein the plurality of monitoring airplanes comprise a fleet of commercial, military, or business airplanes.

6. The weather monitoring system of claim 1, wherein the subscribing user comprises a plurality of subscribing aircraft and wherein an aircraft can be both a monitoring airplane and a subscribing aircraft.

7. The weather monitoring system of claim 6, where the means for advising subscribing aircraft of upcoming weather conditions comprise:

electronic transmission and reception equipment for autonomously transmitting data between the ground-based processing center and each subscribing aircraft; and a ground-based cropping program for creating a subset of predictive indicia that is indicative of individualized upcoming weather conditions for a given subscribing aircraft.

8. The weather monitoring system of claim 7, wherein the electronic transmission and reception equipment for autonomously transmitting data between each monitoring aircraft and the ground-based processing centers are configured to autonomously transmit the atmospheric, temporal, altitudinal, and positional data from the monitoring aircraft to the ground-based processing center.

9. The weather monitoring system of claim 7, wherein the subset of predictive indicia is indicative of current or upcoming turbulence in the planned or alternative flight path of the given subscribing aircraft.

10. The weather monitoring system of claim 1, wherein data bandwidth limitations are substantially overcome by a means selected from the group transmission delay, data compression, and message prioritization.

11. The weather monitoring system of claim 1, wherein:

wherein the subscribing user's application of said upcoming weather conditions is substantially non-aviation related.

12. The weather monitoring system of claim 1, wherein the primary measurement means further comprise a set of sensors for measuring static air temperature, wind speed, and wind direction.

13. The weather monitoring system of claim 12, wherein the primary measurement means further comprise at least one accelerometer for measuring normal acceleration.

14. The weather monitoring system of claim 1, wherein measurements taken by the primary measurement means are indicative of in-flight turbulence.

15. The weather monitoring system of claim 1, wherein the primary measurement means further comprise a relative humidity gauge.

16. The weather monitoring system of claim 1, wherein the secondary measurement means uses GPS input to determine aircraft altitude at the time of measurement.

17. The weather monitoring system of claim 1, wherein the secondary measurement means comprise a radiofrequency altitude sensor.

18. The weather monitoring system of claim 1, wherein the primary measurement means are part of the local air data system.

* * * * *